United States Patent
Baksh et al.

[11] Patent Number: 5,735,938
[45] Date of Patent: Apr. 7, 1998

[54] METHOD FOR PRODUCTION OF NITROGEN USING OXYGEN SELECTIVE ADSORBENTS

[75] Inventors: Mohamed Safdar Allie Baksh; Frank Notaro, both of Amherst, N.Y.

[73] Assignee: Praxair Technology, Inc., Danbury, Conn.

[21] Appl. No.: 783,086

[22] Filed: Jan. 15, 1997

[51] Int. Cl.$^6$ ............................... B01D 53/053
[52] U.S. Cl. ...................... 95/101; 95/105; 95/138
[58] Field of Search .................. 95/96–98, 100–105, 95/138

[56] References Cited

U.S. PATENT DOCUMENTS

| | | | |
|---|---|---|---|
| 3,142,547 | 7/1964 | Marsh et al. | 95/100 |
| 3,891,411 | 6/1975 | Meyer | 95/102 |
| 4,013,429 | 3/1977 | Sircar et al. | 55/33 |
| 4,070,164 | 1/1978 | Miwa et al. | 95/101 |
| 4,194,890 | 3/1980 | McCombs et al. | 95/98 X |
| 4,263,018 | 4/1981 | McCombs et al. | 95/98 X |
| 4,264,340 | 4/1981 | Sircar et al. | 55/25 |
| 4,512,779 | 4/1985 | Hay | 95/100 |
| 4,589,888 | 5/1986 | Hiscock et al. | 95/100 |
| 4,746,332 | 5/1988 | Tomomura et al. | 95/138 |
| 4,816,039 | 3/1989 | Krishnamurthy et al. | 95/103 X |
| 4,925,461 | 5/1990 | Gemba et al. | 55/26 |
| 4,981,499 | 1/1991 | Hay et al. | 95/100 |
| 5,032,150 | 7/1991 | Knaebel | 95/98 X |
| 5,203,887 | 4/1993 | Toussaint | 55/25 |
| 5,275,640 | 1/1994 | Schroeter et al. | 95/101 |
| 5,346,536 | 9/1994 | Kurashiki et al. | 95/103 |
| 5,382,280 | 1/1995 | Choe et al. | 95/98 |
| 5,441,558 | 8/1995 | Lee et al. | 95/100 |
| 5,505,765 | 4/1996 | Kaji et al. | 95/100 |
| 5,518,526 | 5/1996 | Baksh et al. | 95/100 X |
| 5,565,018 | 10/1996 | Baksh et al. | 95/103 X |

*Primary Examiner*—Robert Spitzer
*Attorney, Agent, or Firm*—Robert J. Follett

[57] ABSTRACT

A PSA method incorporating the invention is applicable to the separation of a preferred gas from a mixture of the preferred gas and a less preferred gas. The PSA method uses an adsorbent bed including one or more layers of $O_2$ equilibrium selective adsorbents, and comprises the steps of: pressurizing the adsorbent bed to a high pressure with a feed of air to enable the adsorbent bed to adsorb $O_2$; extracting from the bed at bed pressure, a flow of $N_2$ and storing at least some of the flow in a product tank; desorbing $O_2$ from the adsorbent bed by feeding void gas in the bed enclosure to a storage tank and venting the adsorbent bed to a low pressure region; purging the adsorbent bed by feeding thereto the void gas from the storage tank; and repressurizing the adsorbent bed to an intermediate pressure with a flow of void gas from the storage tank.

26 Claims, 6 Drawing Sheets

METHOD FOR PRODUCTION OF NITROGEN USING OXYGEN SELECTIVE ADSORBENTS

FIELD OF THE INVENTION

This invention relates to a selective adsorption procedure for extracting a more preferred gas from a mixture of the more preferred gas and a less preferred gas and, more particularly, to a method for the production of nitrogen from a supply of air, using oxygen selective adsorbents under equilibrium conditions.

BACKGROUND OF THE INVENTION

The original Pressure Swing Absorption (PSA) process was developed by Skarstrom, U.S. Pat. No. 2,944,627 and employs a selective adsorbent to remove one component of a gas from a gas mixture. The PSA process comprises four basic steps: (1) adsorption, (2) depressurization, (3) purge, and (4) repressurization. Several variations of the Skarstrom cycle exist in the literature. One such system is described by Lemcoff et al., U.S. Pat. No. 5,176,722, wherein, bed pressure equalization (top-top) and light component (product) back fill steps are incorporated in the PSA cycle.

Many more variations of the original PSA cycle can be found in the literature. For example, U.S. Pat. No. 5,441,558 to Lee et al., U.S. Pat. No. 5,346,536 to Kaneshige et al., and U.S. Pat. No. 4,925,461 to Gemba et al., describe PSA processes for $N_2$ production, wherein, top-top and bottom-bottom bed equalization steps are included. A carbon molecular sieve (CMS) is used as the adsorbent. The inclusion of the top-top and bottom-bottom equalization steps in the PSA cycle result in enhanced $N_2$ purity and a minimization of CMS pulverization.

PSA processes with added complexities exist. Such processes include multiple adsorption beds in series (Sircar et al., U.S. Pat. Nos. 4,264,340, and 4,013,429) or layers of adsorbents in the same bed (Toussaint, U.S. Pat. No. 5,203,887; Schroter et al., U.S. Pat. No. 5,275,640). Choe et al., U.S. Pat. No. 5,382,280, disclose a two stage PSA process for high purity $N_2$ production, wherein a first stage utilizes an $O_2$ rate selective adsorbent (e.g. CMS) for bulk removal of oxygen, and a second stage utilizes an $O_2$ equilibrium selective adsorbent (e.g. organo-metal complexes) for trace removal of oxygen.

Other prior art PSA processes (e.g., U.S. Pat. No. 5,084,075) employ the following steps: (1) adsorption at high pressure, (2) depressurization, (3) enriched waste, i.e. impure heavy component (i.e., readily adsorbable component) removal at low pressure, and (4) repressurization by the light component (i.e., less readily adsorbed component). The product is typically removed during the adsorption step at high pressure.

Other prior art PSA processes, such as the duplex and inverted pressure swing adsorption processes (e.g., U.S. Pat. Nos. 5,085,674, 4,359,328) respectively disclose PSA processes for heavy component recovery at enhanced purity. In the case of the inverted PSA process, the following steps are employed: (1) adsorption at low pressure, (2) pressurization, (3) enriched waste, i.e., impure light component removal at high pressure, and (4) depressurization with release of the heavy component at low pressure as the desired product of enhanced purity. In U.S. Pat. No. 5,042,994, Smolarek describes a PSA process that includes a variable volume nitrogen product storage vessel, which is monitored to determine variations in user product demand; whereas, Lagtee et al. (U.S. Pat. No. 4,810,265) describe an improved PSA process that enables the heavy component (e.g. $N_2$) of air to be economically recovered. An $N_2$ copurge is used at the upper adsorption pressure (rinse step), and $O_2$ is used for countercurrent purge at the low pressure level of the cycle and for initial repressurization in a countercurrent backfill step.

U.S. Pat. No. 5,228,888, to Gmelin et al., describes a PSA process for $N_2$ production, wherein air is passed through a bed of crushed zeolite having a particle size of 10 to 40 mesh, thereby adsorbing oxygen and producing an enriched nitrogen product. Sircar et al. (U.S. Pat. No. 4,013,429) and Knaebel (U.S. Pat. No. 5,032,150) describe PSA processes for air fractionation to provide a high purity $N_2$ product gas and an $O_2$ product, wherein a nitrogen rinse step is used. In U.S. Pat. No. 5,084,075, Sircar describes a three bed Vacuum PSA (VPSA) process for recovering $N_2$ from air, wherein the adsorbent beds are not rinsed with nitrogen prior to the depressurization of the bed to recover the heavy component ($N_2$). Sircar asserts that the deletion of the $N_2$ rinse step results in a reduction of the energy consumption and capital requirements of the PSA process.

Additional PSA processes for the production of $N_2$ as the principal product and $O_2$ as a co-product have been disclosed by Werner et al. (U.S. Pat. No. 4,599,094), Lagree et al. (U.S. Pat. No. 4,810,265), Wilson (U.S. Pat. No. 4,359,328), and Leavitt (U.S. Pat. Nos. 5,074,892, and 5,085,674).

In all of the described prior art processes, when the desired $N_2$ purity is set to at least 99.99%, the product yield from the PSA process decreases significantly, resulting in a very high bed size factor (BSF) and power consumption. Consequently, in order to meet the requirement for high purity $N_2$, it is necessary to add to the PSA process a post purification unit. Such post purification unit, commonly referred to as deoxo unit, takes the effluent stream from the PSA process and reacts the residual oxygen in the presence of a catalyst. Such prior art processes (deoxo) dealing with the trace removal of the oxygen are disclosed by Garg et al. (U.S. Pat. Nos. 5,348,592; 5,320,818, and 5,290,480); Epting (U.S. Pat. No. 5,322,676); Louise et al. (U.S. Pat. No. 5,238,670), and Thorogood et al. (U.S. Pat. No. 4,869,883). Inherent in the use of a deoxo unit, is the contamination of unreacted species in the $N_2$ product. Thus, additional purification unit(s) may be required after the deoxygenation process.

An alternative to PSA processes for the production of $N_2$ from air is based on membrane technology. Such membrane based $N_2$ processes are disclosed by Barbe et al. (U.S. Pat. No. 5,302,189), Prasad et al. (U.S. Pat. No. 5,122,355), Prasad (U.S. Pat. No. 4,931,070), Xu (U.S. Pat. No. 5,306,427), and Campbell (U.S. Pat. No. 4,960,579).

As indicated above, many modifications and variations of the basic PSA cycle have been studied and applied to the commercial production of $N_2$ from air. However, most of these processes use $O_2$ rate selective adsorbents (e.g. carbon molecular sieves), or $N_2$ equilibrium selective adsorbents (e.g. zeolites). For example, U.S. Pat. Nos. 5,042,994 and 5,032,150 describe PSA cycles which use $N_2$ equilibrium selective adsorbents (e.g. zeolites) for the production of $N_2$ from air. However, since $N_2$ is produced during the regeneration stage of the cycle, recompression of the product gas ($N_2$) is invariably required, resulting in an increase in the power consumption. In addition, since the major component of air is $N_2$, the $N_2$ selective adsorbents are forced to handle most of the feed air, and the available equilibrium selectivities impose process restrictions and limit separation efficiency, leading to a high bed size factor (BSF) and high power consumption.

Alternatively, kinetically controlled carbon molecular sieves ($O_2$ rate selective over $N_2$) have been used in PSA cycles for $N_2$ production from air, see Choe et al., U.S. Pat. No. 5,382,280, Lee et al., U.S. Pat. No. 5,441,558, and Gemba et al., U.S. Pat. No. 4,925,461. The $N_2$ and $O_2$ adsorption isotherms and uptake rates on a typical carbon molecular sieve, namely, a Bergbau-Forschung carbon molecular sieve (BF-CMS) are shown in FIGS. 1 and 2, respectively. FIG. 1 is a plot of amount adsorbed versus pressure for both $O_2$ and $N_2$. FIG. 2 is a plot of fractional uptake versus time (in seconds) for $O_2$ and $N_2$.

Note from FIG. 1 that BF-CMS has no equilibrium selectivity for $O_2/N_2$ (i.e., under non-transient or equilibrium conditions). Thus, in the production of $N_2$ from air, using BF-CMS as the adsorbent, the separation is effected by the much faster uptake rate of $O_2$ over $N_2$ as shown in FIG. 2. Also, inherent in the use of kinetically controlled carbon molecular sieves, is the decrease in $O_2$ selectivity over $N_2$ as the adsorption time is increased (after 30 or so seconds, the selectivity essentially disappears). Thus, CMS based adsorbents are primarily used in PSA cycles having short cycle times.

In addition, CMS based adsorbents have neither high density or crush strength. Consequently, in fast PSA cycles, the sudden pressure changes can cause the CMS based adsorbent to flow and pulverize due to the grinding action among the granules. To minimize pulverization, the flowrate of the transferring gas is reduced, with a concomitant increase in cycle time, viz., lower product make rate and higher bed size factor.

Some prior art processes disclose the use of layered adsorbents (Toussaint, U.S. Pat. No. 5,203,887; Schroter et al., U.S. Pat. No. 5,275,640) or multiple adsorption beds in series (Choe et al., U.S. Pat. No. 5,382,280; Sircar et al., U.S. Pat. Nos. 4,264,340 and 4,013,429). For example, Toussaint discloses the use of two layers of $N_2$ equilibrium selective adsorbents to bring about a reduction in the adsorbent cost to the PSA process.

Choe et al. (U.S. Pat. No. 5,382,280) discloses a two stage PSA process for high purity $N_2$ production, wherein, the first stage utilizes an $O_2$ rate selective adsorbent (e.g. CMS) for bulk removal of oxygen, and the second stage utilizes an $O_2$ equilibrium selective adsorbent (e.g. organo metal complexes, see U.S. Pat. No. 5,294,418) for trace removal of $O_2$. However, the Choe et. al. PSA process utilizes CMS; consequently, all of the disadvantages associated with the use of CMS adsorbents remain. In addition, the $O_2$ equilibrium selective adsorbent in the second stage cannot be exposed to high $O_2$ concentration. Thus, in the Choe et al. process, the $O_2$ equilibrium selective adsorbent is primarily used for trace $O_2$ removal, and CMS is used in the first stage for bulk separation of air.

Accordingly, it is an object of the invention to provide an improved PSA method for the extraction of a preferred gas from a mixture of the preferred gas and a less preferred gas, the method employing an adsorbent bed which is selective for the less preferred gas.

It is another object of the invention to provide an improved PSA method for extraction of $N_2$ from air, the method employing an adsorbent bed which is $O_2$ selective under equilibrium conditions.

It is another object of the invention to provide an improved PSA method for the extraction of $N_2$ from air, the method employing a layered adsorbent bed which is $O_2$ selective under equilibrium conditions.

It is a further object of the invention to provide a highly efficient PSA process for producing large volumes of high purity $N_2$ from air, with a low bed size factor and power requirement, via the use of $O_2$ equilibrium selective adsorbents.

SUMMARY OF THE INVENTION

A PSA method incorporating the invention is applicable, in general, to separation of a preferred gas from a mixture of the preferred gas and a less preferred gas. A preferred embodiment of the method is used for the production of high purity $N_2$ from air. The PSA method uses an adsorbent bed including one or more layers of $O_2$ equilibrium selective adsorbents. When multiple adsorbent layers are employed, the $O_2$ equilibrium selective adsorbents are arranged so that the adsorbent with the lowest affinity for $O_2$ is placed near the feed end of the bed, and the adsorbent with the highest affinity for $O_2$ is placed near the product end of the bed.

The PSA method comprises the steps of: pressurizing the adsorbent bed to a high pressure with a feed of air to enable the adsorbent bed to adsorb $O_2$; extracting from the bed at bed pressure, a flow of $N_2$ and storing at least some of the flow in a product tank; desorbing $O_2$ from the adsorbent bed by feeding void gas in the bed enclosure to a storage tank and venting the adsorbent bed to a low pressure region; purging the adsorbent bed by feeding thereto the void gas from the storage tank; and repressurizing the adsorbent bed to an intermediate pressure with a flow of void gas from the storage tank.

DETAILED DESCRIPTION OF A PREFERRED EMBODIMENT

Figure 1:
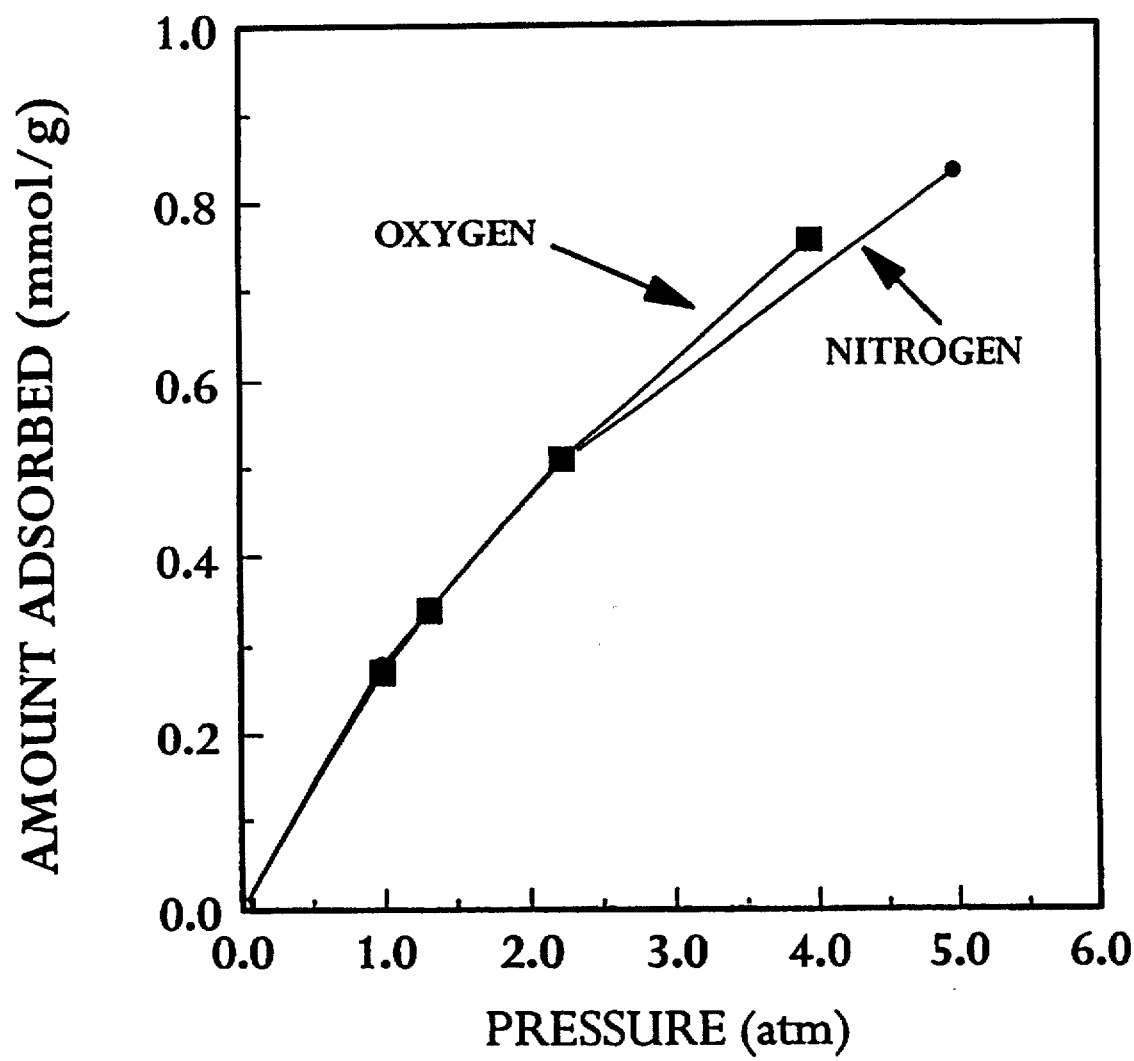
FIG. 1 is a plot of adsorption isotherms (i.e., amount adsorbed versus pressure) for a prior art Bergbau-Forschung carbon molecular sieve.
Figure 2:
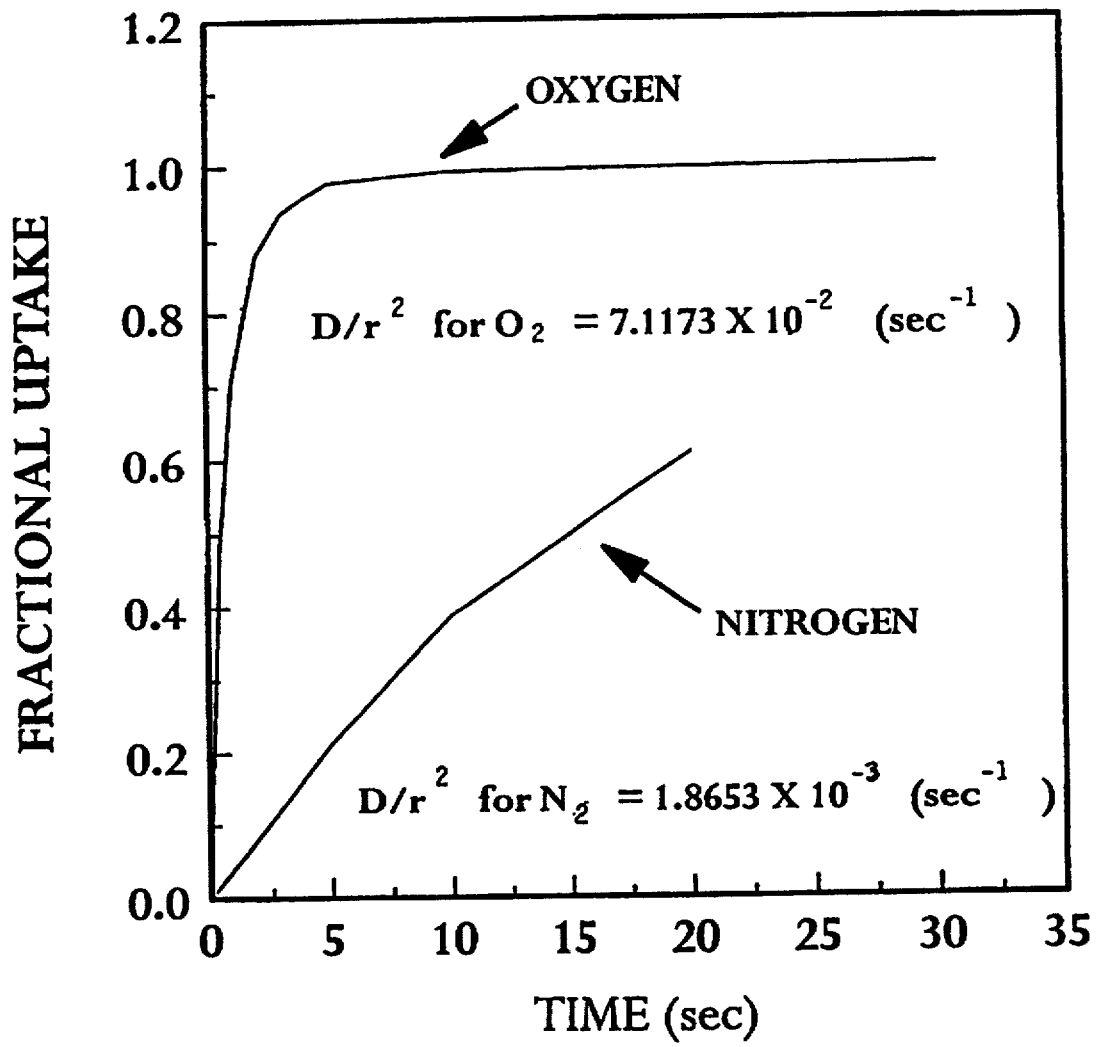
FIG. 2 is a plot of uptake rates (i.e., fractional uptake versus time) for a prior art Bergbau-Forschung carbon molecular sieve.
Figure 3:
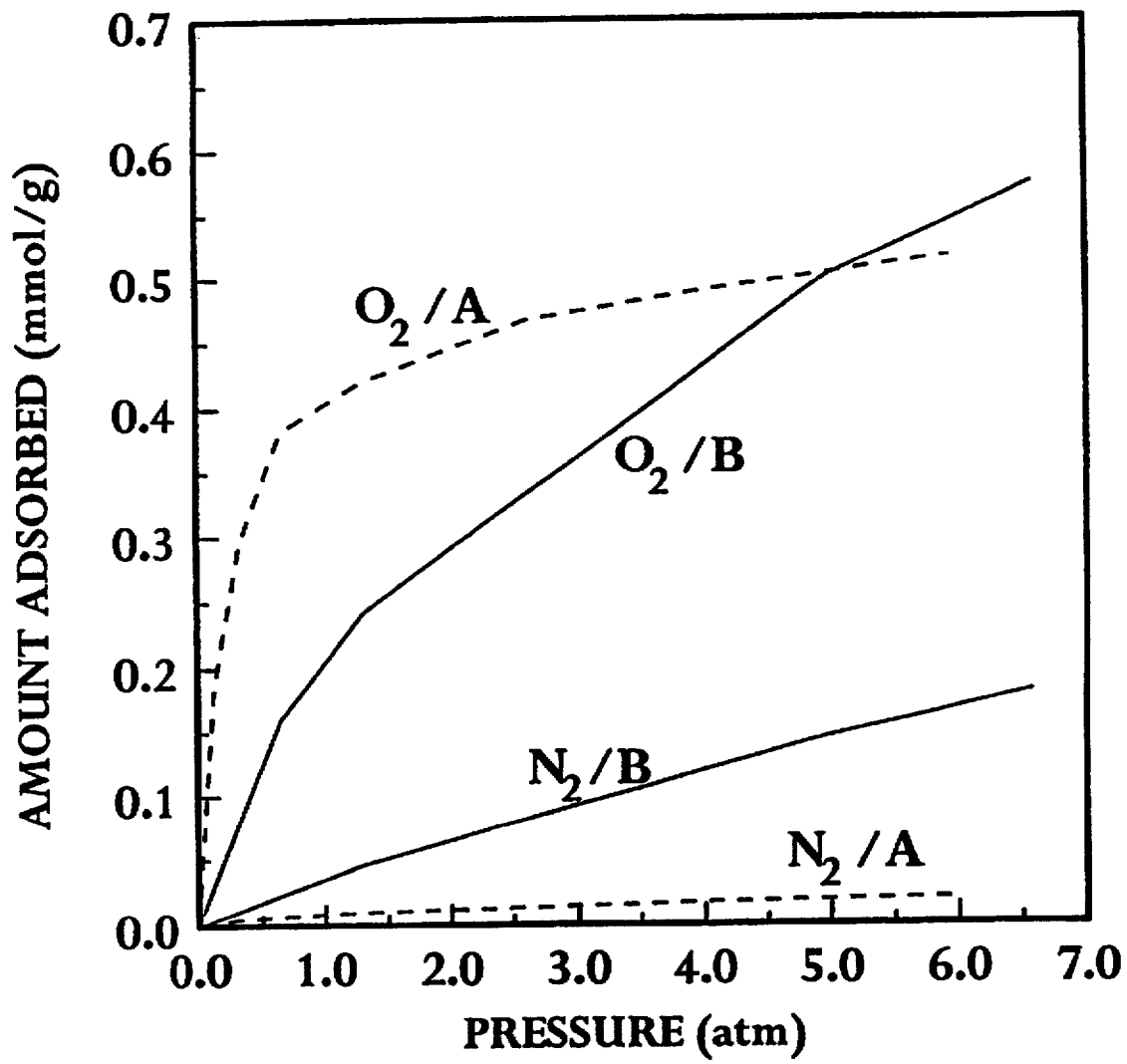
FIG. 3 is a plot of adsorption isotherms (i.e., amount adsorbed versus pressure) for two oxygen equilibrium selective adsorbents used with the invention.

This invention incorporates a PSA cycle using $O_2$ equilibrium selective adsorbent(s), to produce high purity (>99.999%) $N_2$, wherein no post purification process (e.g., "deoxo") is utilized. Adsorbents having $O_2/N_2$ equilibrium selectivities and virtually no $O_2/N_2$ rate selectivities are used. The sorption properties of two preferred $O_2$ equilibrium selective adsorbents (A & B) are shown in FIG. 3 which plots amount adsorbed versus pressure. The adsorbents are three-dimensional transition element complexes (TECs) based on cobalt(II). Most preferred adsorbents are as follows:

Adsorbent A: Co{3,5-diBu$^r$sal/(EtO) (Co$_2$Et) Hmal-DAP}

Adsorbent B: Co(3,5-diBu$^r$salDAP)

Co (3,5-diBu$^r$sal/(EtO) (Co$_2$Et) Hmal-DAP) is the cobalt (II) complex of the dianion of a chelating ligand derived formally by the 1:1 condensation of ethoxymethylenediethylmalonate and 3,4-diaminopyridine (DAP), followed by Schiff base condensation of the remaining primary amine group with 3,5-di-tert-butylsalicylaldehyde (3,5-diBu'sal).

Co(3,5-diBu'salDAP) is the cobalt (II) complex of the dianion of a chelating ligand derived formally from a Schiff base condensation between 3,4-diaminopyridine (DAP) and two equivalents of 3,5-di-tert-butylsalicylaldehyde (3,5-diBu'sal).

The above materials, as well as other adsorbents which are less preferred in the practice of the invention, are described in detail in co-pending, commonly assigned U.S. patent application Ser. No. 08/784,175 (Docket No. D-20299, "Oxygen Selective Sorbents" Stephenson et al), the teachings of which are herein incorporated by reference.

Other less preferred cobalt(II) adsorbents that exhibit $O_2$ selectivity over $N_2$ are described in U.S. Pat. No. 5,294,418 to Ramprasad et al. Still other compositions which may be useful in the practice of this invention, but which are less preferred, are described in co-pending, commonly assigned U.S. patent application Ser. No. 08/339,872 (Mullhaupt et al), the teachings of which are herein incorporated by reference. An example of such a composition is BzIm/Co($T_{piv}$PP), which may be used as Adsorbent A. BzIm/Co($T_{piv}$PP) is a supported TEC composition consisting of 1-benzylimidazole (BzIm) (17 wt. %), cobalt(II) picket-fence porphyrin (disclosed in Collman in *Accounts of Chemical Research*, 1977, 10, 265) and abbreviated Co($T_{piv}$PP) (62 wt. %), and dense small particles of silica having a particle size of about 50 Angstroms (21 wt. %). Coating was performed by chloroform evaporation under an inert atmosphere using a solution of BzIm and Co($T_{piv}$PP).

Figure 4:
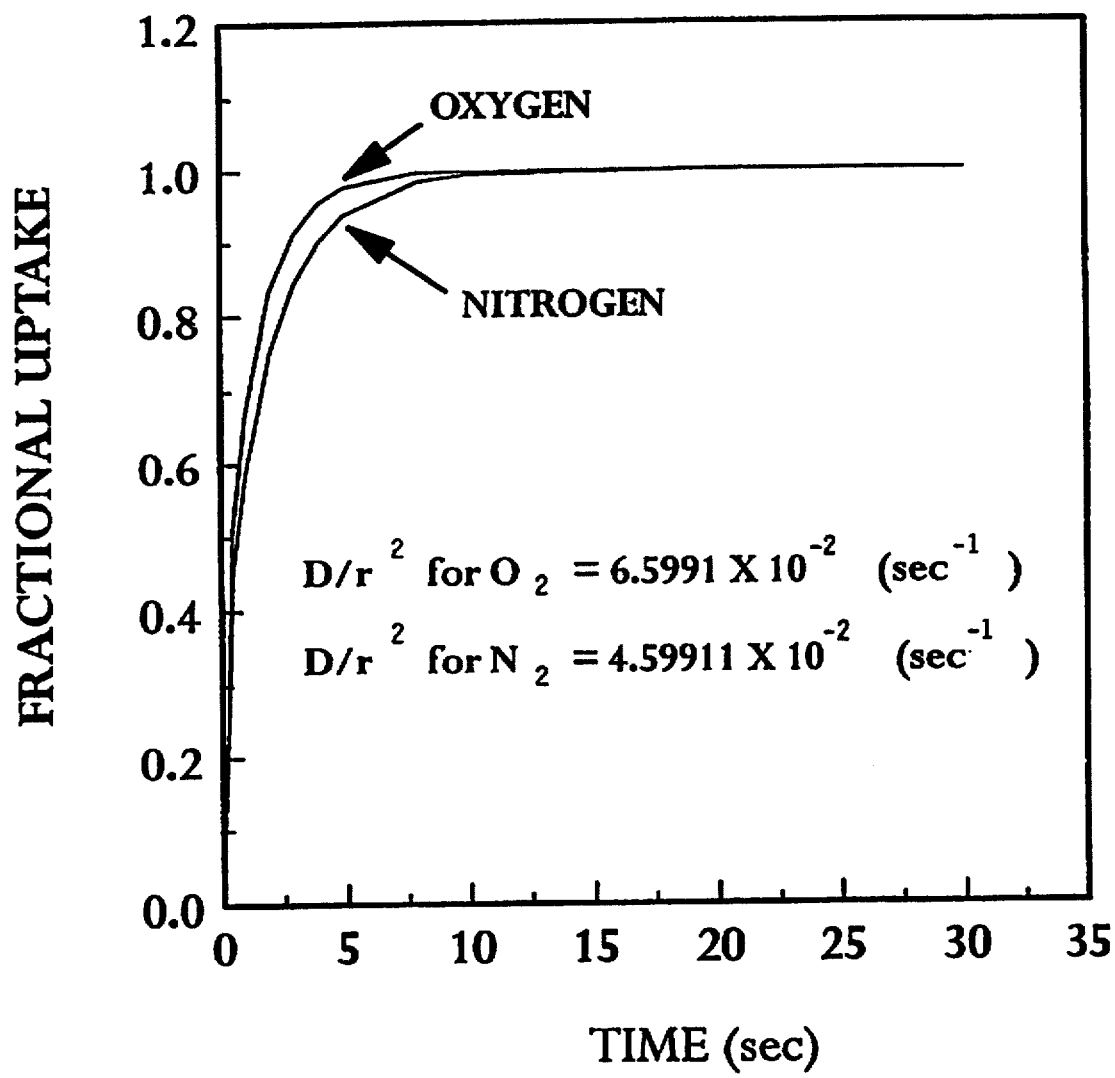
FIG. 4 is a plot of uptake rate (i.e., fractional uptake versus time) for an oxygen equilibrium selective adsorbent shown in FIG. 3.

FIG. 4 illustrates the $N_2$ and $O_2$ uptake rates for the $O_2$ equilibrium selective adsorbent B. Note from FIGS. 1-4, the different sorption characteristics of the $O_2$ equilibrium selective adsorbents (A & B) in comparison with BF-CMS. Adsorbents A and B show high $O_2/N_2$ equilibrium selectivity and hardly any rate selectivity; whereas, BF-CMS shows only $O_2/N_2$ rate selectivity and no equilibrium selectivity.

As will be understood from the description below, the PSA cycle of this invention employs two storage tanks and requires no bed-bed equalization step(s). Further, reflux gas of increasing purity is used for purging and product repressurization. In prior art PSA processes, the bed-bed equalization step allows gas of decreasing purity to be utilized in the equalization step. Because the invention utilizes $O_2$ equilibrium selective adsorbent(s) and not rate selective adsorbents (e.g., CMS), the disadvantages of CMS based adsorbents in PSA cycles are not encountered, since the $O_2$ selectivity over $N_2$ is independent of the adsorption time, i.e. the separation is based on equilibrium, not kinetics.

Further, by using an $O_2$ equilibrium selective adsorbent, $N_2$ is produced during the high pressure adsorption step of the PSA cycle (as opposed to during the desorption step(s) of a PSA cycle using zeolites), and $O_2$ (the minor component of air) is removed from the feed air instead of the major component ($N_2$).

The $O_2$ equilibrium selective adsorbent can be exposed to high $O_2$ concentration; consequently, the method of the invention does not require the use of CMS adsorbents for bulk removal of $O_2$. This is unlike prior art processes which use more than one adsorbent for the purpose of reducing adsorbent costs, or two stages to avoid exposing the $O_2$ equilibrium selective adsorbent to high $O_2$ concentration. This invention employs plural layers of $O_2$ equilibrium selective adsorbents to achieve a significant reduction in power consumption of the PSA process.

Whenever plural layers of $O_2$ equilibrium selective adsorbents are used in the PSA process of this invention, the adsorbents are arranged in a defined order, so that the adsorbent with the lowest affinity for $O_2$ is placed at the feed end of the bed, and the adsorbent with the highest affinity for $O_2$ is placed at the product end of the bed. Thus, referring to FIG. 3, adsorbent A is placed near the product end of the bed, and adsorbent B near the feed end of the bed. Such an arrangement of the $O_2$ equilibrium selective adsorbents, brings about a significant reduction in power consumption of the PSA process, when compared to a bed comprising a single layer of $O_2$ equilibrium selective adsorbent.

Figure 5:
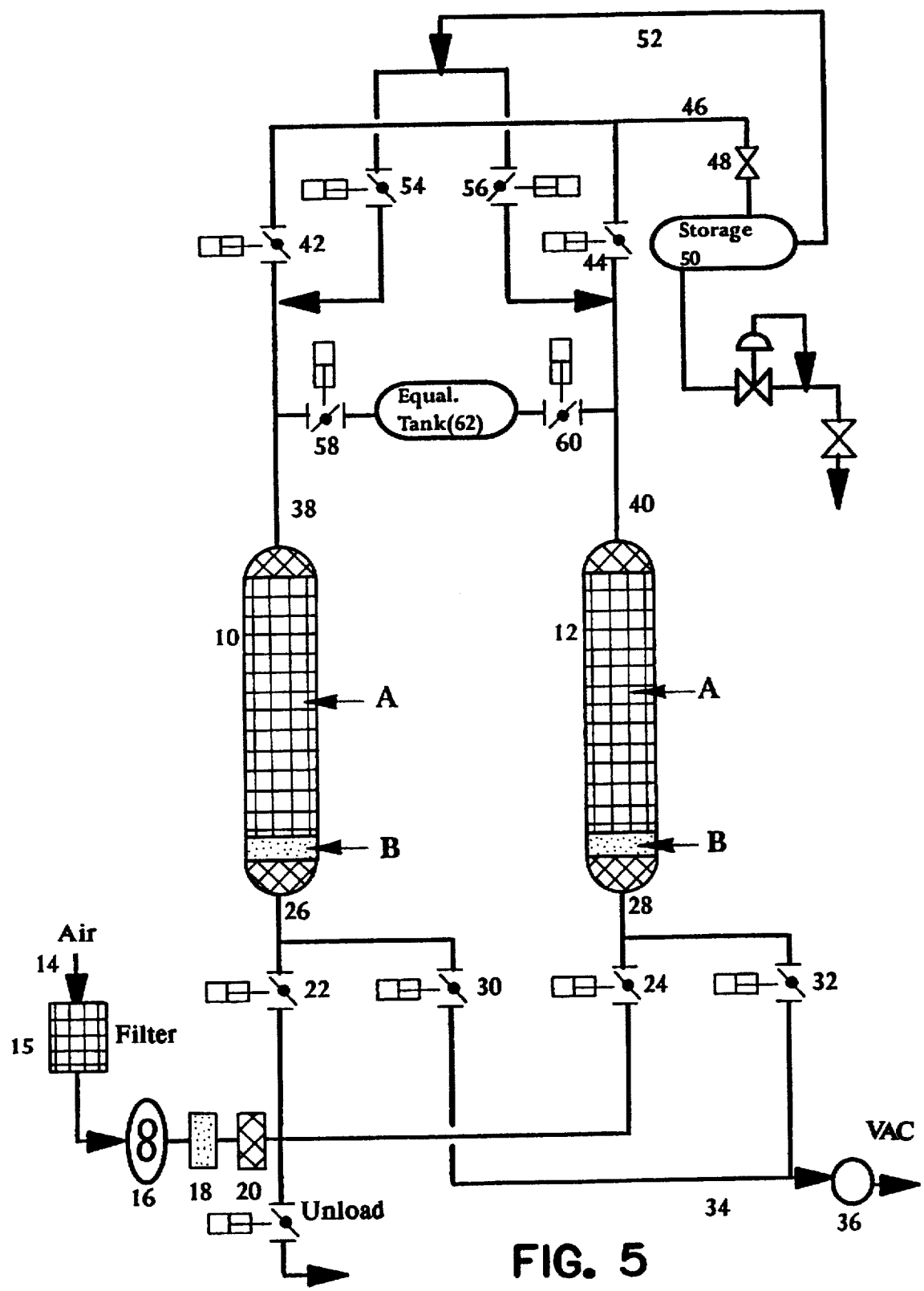
FIG. 5 is a schematic diagram of a PSA system for performing the method of the invention.
Figure 6:
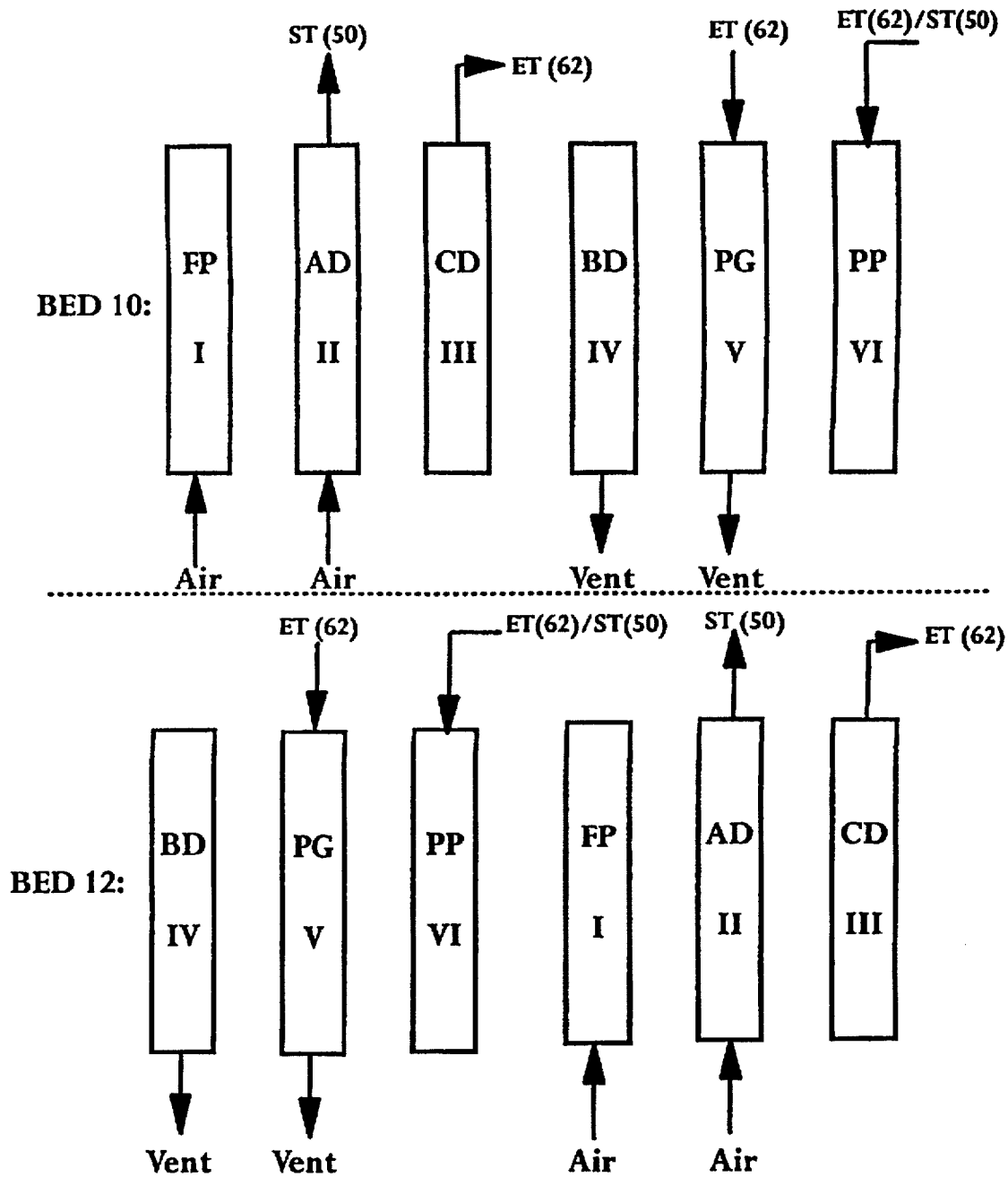
FIG. 6 is a schematic diagram illustrating the concurrent operation of the adsorbent beds of FIG. 5.

While the invention will hereafter be illustrated by describing the operation of a two bed PSA system, it is to be understood that one bed, or more than two beds, can be employed using this invention. Referring to FIGS. 5 & 6, the PSA cycle will be described (as implemented over an exemplary cycle time of 64 seconds).

The PSA system (see FIG. 5) comprises two beds 10 and 12, each filled with layered adsorbents A and B, as described above. An air inlet conduit 14 provides feed air via a filter 15 to a compressor 16 which, in turn, feeds compressed air through an oil and water filter 18 and carbon trap 20 to feed valves 22 and 24, and bed inlets 26 and 28, respectively. A pair of exhaust valves 30 and 32 connect bed inlets 26 and 28 to conduit 34, which is, in turn, coupled to an optional vacuum pump 36.

Beds 10 and 12 include product outlet conduits 38 and 40 which communicate, via valves 42 and 44, to a product conduit 46, and through a control valve 48 to a product storage tank 50. Conduit 52 and valves 54 and 56 enable a feed of product gas from storage tank 50 to beds 10 and 12, respectively. Conduit 52 supplies the gas necessary for refluxing (purging and product pressurization).

Outlet conduits 38 and 40 are further connected via valves 58 and 60, respectively, to allow gas obtained from a cocurrent depressurization step to enter an equalization tank 62. All of the valves in FIG. 5 are operated electronically via a computer system and program logic (not shown). In the practice of this invention, the gas required for purging is first taken from equalization tank 62. If additional purge gas is required, then higher purity gas is taken from product storage tank 50, via conduit 52.

After purge is completed, then product pressurization begins. Gas required for the product pressurization step is obtained from product storage tank 50. However, if after purging, equalization tank 62 contains residual gas, then the residual gas is used in the early stage of product pressurization. Once the gas in equalization tank 62 is depleted, then the higher purity gas from storage tank 50 is used for completing product pressurization.

Prior to describing the detailed operation of the system of FIG. 5, a brief overview of the PSA process which incorporates the invention will be described.

(I) The feed (e.g., air) is introduced at one end of an adsorption bed to pressurize the bed from an intermediate pressure level, selected between 2.0–5.0 atm. (1 atm.= 14.696 psi), and preferably between 3.0–4.4 atm., to a high pressure level, selected between 5.0–8.0 atm., and preferably between 5.0–7.0 atm. A low pressure level is selected between 0.3–1.0 atm., and preferably between 0.5–1.0 atm.

(II) Bed pressure during the production step preferably occurs at a rising pressure extending from the intermediate pressure level of 2.0–5.0 atm (the pressure at the end of the product pressurization step) to an adsorption pressure of 5.0–8.0 atm. Alternatively, feed pressurization (without bleed) can first occur to enable a reaching of the adsorption pressure. Then, a control valve is opened to enable a product feed. In the latter case, the pressure is maintained constant during the production step. The effluent gas stream is directed into a storage tank.

(III) The feed input is terminated, and the bed is depressurized to recover the void gas and light component that co-adsorbed on the adsorbent. The pressure during depressurization is decreased from the adsorption pressure of 5.0–8.0 atm to about 3.0–6.0 atm. The effluent during this step is collected into an equalization tank.

(IV) A counter-current blowdown/evacuation step reduces the bed pressure to the low pressure level of about 0.5–1.0 atm.

(V) Next the adsorbent bed is purged counter-currently, using a purging gas obtained from the equalization tank. If the equalization tank is depleted of purging gas, then additional purging gas, with higher purity, is obtained from the storage tank. In the preferred mode of operation, all of the purging gas is obtained from the equalization tank.

(VI) The adsorbent bed is next pressurized, counter-currently, with product gas obtained from any remaining gas from the equalization tank, then followed with higher purity gas from the storage tank. The pressure in the bed during this step is increased from the low pressure level of 0.5–1.0 atm to an intermediate pressure level of 2.0–5.0 atm and the process repeats.

Referring now to FIGS. 5 and 6, the two-bed PSA process will now be described in conformance with the steps described above. In the description, all valves are assumed to be closed in each step of the cycle, unless explicitly declared to be in the open position for that step.

Step I: Feed pressurization step.

Bed 10: Feed (air) is introduced at one end of bed 10 by opening valve 22 to allow the feed air to enter and pressurize bed 10. Bed 12: During this time, valve 32 is opened and bed 12 undergoes step IV (blowdown/evacuation).

Step II: Gross product make step.

Bed 10: Here valves 22 and 42 are open. Control logic dictates when control valve 48 will open to allow product gas to enter the product tank 50. For instance, if constant pressure is required, then control valve 48 only opens when bed 10 reaches a predetermined pressure level to allow product gas to enter storage tank 50. Bed 12: During this product make step, valves 32 and 60 are open. Note that the gas required for the purge step was received from equalization tank 62. However, if additional gas is required for purging, then valve 60 is closed and valve 56 is opened, to allow higher purity gas from product tank 50 to enter bed 12. In the preferred mode of operation, all of the purging gas comes from the equalization tank.

Step III: Cocurrent depressurization step. Bed 10: Valves 22 and 42 are closed and valve 58 is opened to allow bed 10 to undergo the cocurrent depressurization step. Bed 12: During this time, valve 32 is closed, and valve 56 is opened, so that product gas is obtained from the product tank 50 for product pressurization of bed 12. Note that if equalization tank 62 contains residual gas after the purge step applied to bed 12, then prior to opening valve 56, valve 60 is opened to use any residual gas from equalization tank 62 the early stage of product pressurization. Upon depleting all of the residual gas in equalization tank 62, valve 60 is closed and valve 56 is opened to complete bed 12 product pressurization step.

Step IV: Blow down step.

Bed 10: Valve 58 is closed and valve 30 is opened to blowdown/evacuate bed 10 counter-currently.

Bed 12: During this time, valve 56 is closed and valve 24 is opened so that bed 12 undergoes feed pressurization at one end of the bed.

Step V: Purge step.

Bed 10: Valve 58 is now opened, so that bed 10 receives gas from equalization tank 62 for purging. If additional gas is required for purging, then valve 58 is closed and valve 54 is opened, to allow higher purity gas from product tank 50 to enter bed 12. In the preferred mode of operation, all of the purging gas comes from equalization tank 62. During this time, valve 30 remains in the opened position.

Bed 12: Valves 24 and 44 are opened so that bed 12 is in the production step. Control logic operates valve 48 to enable a flow of product gas from bed 12 to product tank 50.

Step VI: Product pressurization step.

Bed 10: During product pressurization of bed 10, valve 30 is closed, and valve 54 is opened, so that product gas is obtained from product tank 50 for bed 10 product pressurization. Note that if equalization tank 62 contains residual gas after bed 10 purge step, then prior to opening valve valve 58 is opened to use any residual gas from equalization tank 62 in the early stage of product pressurization. Upon depleting all of the residual gas in equalization tank 62, valve 58 is closed and valve 54 is opened to complete bed 10 product pressurization step.

Bed 12: During this time, valves 24 and 44 are closed, and valve 60 is opened to direct effluent from bed 12, now undergoing the cocurrent depressurization step, to enter equalization tank 62.

Based on the PSA cycle described above, several modifications can be made to alter one or more of the steps without deviating from the invention. For example, the feed and product pressurization steps can occur simultaneously, rather than sequentially as described above. Also, if the low pressure level in the cycle is less than 1.0 atm, i.e., the PSA cycle utilizes a vacuum pump for evacuation, then the countercurrent depressurization step can be preceded by opening to air until the pressure in the bed drops to 1.0 atm, then evacuation can begin.

The two-bed PSA cycle (i.e., FIGS. 5 and 6) can also be operated without the use of equalization tank 62. In such a mode of operation, all of the purging gas comes from the product tank 50 or directly from the other bed in the product make step. However, using two storage tanks (i.e., 50 and 62) allows for greater flexibility in the process. For example, the individual steps in the cycle shown in FIG. 6 do not have to occupy fixed periods of time. Thus, physical variables such as pressure and composition can be used to determine the time allocated for each step; thereby, adjusting the process for changes in temperature, pressure and product demand. Since no bed-bed gas transfer is required, it is possible to run each bed independently, and regard the process as a collection of single bed units. However, for proper sizing and sharing of compressor(s) and vacuum pump(s), some synchronization of the overall cycle of each bed with the cycles of the other beds is necessary.

Although the invention described here makes use of cylindrical adsorbent beds with shallow dished heads on the top and bottom, and gas flow in the axial direction, other bed configurations may be used. For example, radial beds may be used to achieve a reduction in pressure losses with a concomitant reduction in power consumption. In addition, beds of different adsorbents can be placed in series instead of in layers within a single bed when two or more $O_2$ equilibrium selective adsorbents are used in the PSA process.

In addition, other adsorbents can be packed at various positions in the bed. For example, activated alumina can be placed at the feed end of the bed to remove water and carbon dioxide from the feed stream, then one or more layers of $O_2$ equilibrium selective adsorbents can be placed on top of the activated alumina to perform the separation of air into a nitrogen enriched product.

Other modifications of the PSA process can be implemented without deviating from the invention. For example, the PSA process of the invention can include the removal of other minor contaminants such as CO, or lighter hydrocarbons, which have a tendency to break through. To prevent the break through of the contaminants, the adsorber bed is modified to include a catalyst, either as a discrete layer or as a component of an adsorbent mixture, which will convert species like CO to $CO_2$, which is subsequently removed. Also, additional layers of adsorbents can be added if necessary to remove the reaction product(s). Another variation is the distribution of the catalyst layer in regions of the bed where the $O_2$ concentration is not yet sufficiently depleted.

The PSA cycle has been described in relation to PSA $N_2$ processes, wherein particular embodiments have been shown, other embodiments are contemplated along with modification of the disclosed features, as being within the scope of the invention. For example, the PSA cycle is not restricted to trans-atmospheric vacuum pressure swing adsorption (VPSA) cycles, and super atmospheric or subatmospheric PSA cycles may also be used. Also, the PSA cycle can be used in other mixture separations, e.g., $N_2/CH_4$ separation from landfill gas, and other gas mixtures, for example, feed containing hydrogen as the nonpreferentially adsorbed product component and various impurities as selectively adsorbable components. These include light hydrocarbons, CO, $CO_2$, $NH_3$, $H_2S$, Ar, and $H_2O$.

Hydrogen-rich feed gas containing at least one of these adsorbable components includes: catalytic reformer off-gas, methanol synthesis loop purge, dissociated ammonia and demethanizer over-head gas, steam-reformed hydrocarbons, ammonia synthesis loop purge gas, electrolytic hydrogen and mercury cell hydrogen. This invention is also useful for separating any or all of the aforementioned adsorbables from gas mixtures in which nitrogen or helium is the primary constituent.

The following tables give three examples of the operating conditions and PSA simulation results using the process depicted in FIGS. 5 & 6. In the tables, the symbols have the following meaning: TPD=ton (2000 $lb_m$) per day of nitrogen, kPa=1000 Pa=S.I. unit for pressure (1.0 atm.= 101.325 kPa), s=time unit in seconds, and kW=kilowatt. The PSA process conditions and simulation results for the aforementioned three cases are as follows:

TABLE 1

An example using a single layer of the $O_2$ equilibrium selective adsorbent (adsorbent B in FIG. 3), and the PSA process depicted in FIGS. 5 & 6, operating under super-atmospheric condition.

| Adsorbent: | $O_2$ equilibrium selective adsorbent (adsorbent B in FIG. 3) |
|---|---|
| Cycle time: | 64s |
| High pressure: | 790.335 kPa |
| Low pressure: | 101.325 kPa |
| Pressure at the end of cocurrent depressurization: | 567.420 kPa |
| Pressure at the end of product pressurization: | 445.83 kPa |
| Feed rate: | 294.55 NCFH |
| Product rate: | 86.89 NCFH |

TABLE 1-continued

An example using a single layer of the $O_2$ equilibrium selective adsorbent (adsorbent B in FIG. 3), and the PSA process depicted in FIGS. 5 & 6, operating under super-atmospheric condition.

| Nitrogen purity (mol %): | 99.9995% |
|---|---|
| Nitrogen recovery: | 37.34% |
| Bed size factor (BSF): | 299.14 lb/TPD |
| Power: | 9.785 kW/TPD |
| Purge/Feed (P/F) | 0.40 |
| Temp (K.) | 300 |

TABLE 2

An example demonstrating the application of this invention using a single layer of the $O_2$ equilibrium selective adsorbent (adsorbent B in FIG. 3), and the PSA process depicted in FIGS. 5 & 6, operating under transatmospheric condition.

| Adsorbent: | $O_2$ equilibrium selective adsorbent (adsorbent B in FIG. 3) |
|---|---|
| Cycle time: | 64s |
| High pressure: | 689.010 kPa |
| Low pressure: | 50.663 kPa |
| Pressure at the end of cocurrent depressurization: | 466.095 kPa |
| Pressure at the end of product pressurization: | 312.08 kPa |
| Feed rate: | 294.55 NCFH |
| Product rate: | 86.89 NCFH |
| Nitrogen purity (mol %): | 99.9999% |
| Nitrogen recovery: | 37.48% |
| Bed size factor (BSF): | 293.65 lb/TPD |
| Power: | 9.257 kW/TPD |
| Purge/Feed (P/F) | 0.40 |
| Temp (K.) | 300 |

TABLE 3

An example demonstrating the application of this invention using two layers of $O_2$ equilibrium selective adsorbents (40% A & 60% B in FIG. 3) in the same bed, wherein adsorbent A is placed on top of adsorbent B. The results in this table were obtained using the PSA process depicted in FIGS. 5 & 6, operating under transatmospheric condition.

| Adsorbent: | $O_2$ equilibrium selective adsorbent (40% A and 60% B: FIG. 3) |
|---|---|
| Cycle time: | 64s |
| High pressure: | 689.010 kPa |
| Low pressure: | 50.663 kPa |
| Pressure at the end of cocurrent depressurization: | 466.095 kPa |
| Pressure at the end of product pressurization: | 280.67 kPa |
| Feed rate: | 294.55 NCFH |
| Product rate: | 86.89 NCFH |
| Nitrogen purity (mol %): | 99.9996% |
| Nitrogen recovery: | 42.14% |
| Bed size factor (BSF): | 288.98 lb/TPD |
| Power: | 8.286 kW/TPD |
| Purge/Feed (P/F) | 0.40 |
| Temp (K.) | 300 |

From the examples in Tables 1–3, it is clear that the two-bed PSA system of FIG. 5 utilizing the steps of FIG. 6 can be used for producing high purity nitrogen (>99.999%) with a low bed size factor and power consumption. Also, note that the results in Table 1 were obtained using a PSA process wherein the lowest pressure is 101.325 kPa, i.e., no vacuum pump is required to recompress the waste stream, viz, lower capital cost for the PSA process. Thus, in the example depicted in Table 1, the PSA process operates in a super-atmospheric mode.

Tables 2 and 3 correspond to the PSA process using one and two layers of $O_2$ equilibrium selective adsorbents, respectively. Note that in applying the PSA cycle and more than one layer of $O_2$ equilibrium selective adsorbents (Table 3), requires that the adsorbents be arranged in a well defined order. For example, using the adsorbents in FIG. 3, the results in Table 3 require that adsorbent A be placed near the product end of the bed, and adsorbent B near the feed end of the bed. Such an arrangement of the $O_2$ equilibrium selective adsorbents gives about a 10.5% reduction in power of the PSA process (8.29 vs 9.26 kW/TPD) when compared to a single layer of $O_2$ equilibrium selective adsorbent (Table 3 versus Table 2).

In addition, by comparing the results in Tables 2 and 3, the 10.5% reduction in the power consumption of the PSA process, when two layers of $O_2$ equilibrium selective adsorbents are used, is coupled to the PSA cycle type, another feature of this invention. For example, the results of Tables 2 and 3 correspond to using one (i.e., adsorbent B, FIG. 3) and two layers of $O_2$ equilibrium selective adsorbents (A&B, FIG. 3), respectively. The results in Table 3 were obtained when adsorbent A was placed near the product end of the bed, and adsorbent B near the feed end of the bed. During the cocurrent depressurization step of the PSA cycle, adsorbent A prevents, better than adsorbent B, the $O_2$ (the heavy component) from breaking through. Thus, the $N_2$ product obtained during the cocurrent depressurization step, and passed to the equalization tank, is less contaminated with the heavy component than the product obtained in a bed using adsorbent B alone, or for a given average $N_2$ purity during the cocurrent depressurization step, more $N_2$ is recovered using adsorbents A & B, versus using adsorbent B alone.

Also, during the pressurization steps, adsorbent A does not adsorb a significant amount of $N_2$; thereby, causing the bed to reach the high pressure level with less feed compression. Since less feed is required to pressurize the column to the adsorption pressure, a reduction in a power is achieved, viz, a reduction in power consumption of the PSA process.

It should be understood that the foregoing description is only illustrative of the invention. Various alternatives, modifications, and other process conditions (e.g., operating pressure ranges) can be devised by those skilled in the art without departing from the invention.

We claim:

1. A pressure swing adsorption (PSA) method for extracting a more preferred gas from a mixture of said more preferred gas and a less preferred gas, said method employing an adsorbent bed within an enclosure which, on an equilibrium basis, exhibits a selective adsorption preference for said less preferred gas, said method comprising the steps of:
   a) pressurizing said adsorbent bed to a high pressure with a feed of said mixture to enable said adsorbent bed to adsorb said less preferred gas;
   b) extracting from said bed at bed pressure, a flow of said more preferred gas and storing at least some of said flow of more preferred gas in a product tank;
   c) desorbing said less preferred gas from said adsorbent bed by feeding void gas in said enclosure to a storage tank;
   d) further desorbing said less preferred gas from said adsorbent bed by venting said adsorbent bed to a low pressure region;
   e) purging said adsorbent bed by feeding to said adsorbent bed a portion of said void gas from said storage tank; and
   f) pressurizing said adsorbent bed to an intermediate pressure with a further flow of said void gas from said storage tank, and repeating steps a–f until a requirement for said more preferred gas is satisfied.

2. The PSA method as recited in claim 1, wherein said adsorbent bed comprises at least a first layer of adsorbent material and a second layer of adsorbent material, said first layer positioned between an input feed to said adsorbent bed and said second layer positioned between said first layer and an outlet end from said bed, said first layer comprising an adsorbent with a first equilibrium selective sorption capacity for said less preferred gas and said second layer comprising an adsorbent with a second equilibrium sorption capacity for said less preferred gas that is, within an operating range of pressures, greater than said first equilibrium selective sorption capacity for said less preferred gas.

3. The PSA method as recited in claim 2, wherein said more preferred gas is nitrogen and said less preferred gas is oxygen.

4. The PSA method as recited in claim 3, wherein said first layer comprises an adsorbent having a lower $O_2$ to $N_2$ equilibrium selectivity than said second layer.

5. The PSA method as recited in claim 4, wherein said second layer comprises Co(3,5-diBu$^t$sal/(EtO)(Co$_2$Et)Hmal-DAP) and said first layer comprises Co(3,5-DiBu$^t$sal-DAP).

6. The PSA method as recited in claim 1, wherein said pressurizing step f) further feeds a portion of said more preferred gas from said product tank to pressurize said adsorbent bed, if said void gas is insufficient to cause said adsorbent bed to reach said intermediate pressure.

7. The PSA method as recited in claim 1, wherein said mixture is air and said intermediate pressure is selected within the range of 2.0–5.0 atmospheres.

8. The PSA method as recited in claim 7, wherein said intermediate pressure is selected within the range of 3.0–4.4 atmospheres.

9. The PSA method as recited in claim 1, wherein said mixture is air and said high pressure is selected within the range of 5.0–8.0 atmospheres.

10. The PSA method as recited in claim 9, wherein said high pressure is selected within the range of 5.0–7.0 atmospheres.

11. The PSA method as recited in claim 1, wherein said mixture is air and said low pressure is selected within the range of 0.3–1.0 atmospheres.

12. The PSA method as recited in claim 11, wherein said low pressure is selected within the range of 0.5–1.0 atmospheres.

13. The PSA method as recited in claim 1, wherein both said venting and purging are accomplished by a gas flow which is counter-current to a flow of said more preferred gas.

14. A pressure swing adsorption (PSA) method for extracting a more preferred gas from a mixture of said more preferred gas and a less preferred gas, said method employing first adsorbent bed and second adsorbent bed, each bed being contained in an enclosure and, on an equilibrium basis, exhibiting a selective adsorption preference for said less preferred gas, said first adsorbent bed sequentially performing steps a, b, c, d, e and f while said second adsorbent bed concurrently and sequentially performs steps d, e, f, a, b and c, wherein steps a–f comprise:
   a) pressurizing one of said first adsorbent bed or said second adsorbent bed to a high pressure with a feed of said mixture to enable said adsorbent bed to adsorb said less preferred gas;
   b) extracting from said one of said first adsorbent bed or said second adsorbent bed at bed pressure, a flow of said more preferred gas and storing at least some of said flow of more preferred gas in a product tank;

c) desorbing said less preferred gas from said one of said first adsorbent bed or said second adsorbent bed by feeding void gas in said enclosure to a storage tank;

d) further desorbing said less preferred gas from said one of said first adsorbent bed or said second adsorbent bed by venting said one of said first adsorbent bed or said second adsorbent bed to a low pressure region;

e) purging said adsorbent bed means by feeding to said one of said first adsorbent bed or said second adsorbent bed a portion of said void gas from said storage tank; and f) pressurizing said one of said first adsorbent bed or said second adsorbent bed to an intermediate pressure with a further flow of said void gas from said storage tank, and repeating steps a–f until a requirement for said more preferred gas is satisfied.

15. The PSA method as recited in claim 14, wherein each of said first adsorbent bed and said second adsorbent bed comprises at least a first layer of adsorbent material and a second layer of adsorbent material, said first layer positioned between an input feed to said first adsorbent bed and said second adsorbent bed and said second layer positioned between said first layer and an outlet end from said first adsorbent bed and said second adsorbent bed, said first layer comprising an adsorbent with a first equilibrium selective sorption capacity for said less preferred gas and said second layer comprising an adsorbent with a second equilibrium sorption capacity for said less preferred gas that is, within an operating range of pressures, greater than said first equilibrium selective sorption capacity for said less preferred gas.

16. The PSA method as recited in claim 15, wherein said more preferred gas is nitrogen and said less preferred gas is oxygen.

17. The PSA method as recited in claim 16, wherein said first layer comprises an adsorbent having a lower $O_2$ to $N_2$ equilibrium selectivity than said second layer.

18. The PSA method as recited in claim 17, wherein said second layer comprises Co{3,5-diBu$^r$sal/(EtO)(Co$_2$Et)Hmal-DAP} and said first layer comprises Co(3,5-DiBu$^r$sal-DAP).

19. The PSA method as recited in claim 14, wherein said pressurizing step f) feeds said preferred gas from said product tank to pressurize said one of said first adsorbent bed or said second adsorbent bed, if said void gas is insufficient to cause said one of said first adsorbent bed or said second adsorbent bed to reach said intermediate pressure.

20. The PSA method as recited in claim 14, wherein said mixture is air and said intermediate pressure is selected within the range of 2.0–5.0 atmospheres.

21. The PSA method as recited in claim 20, wherein said intermediate pressure is selected within the range of 3.0–4.4 atmospheres.

22. The PSA method as recited in claim 14, wherein said mixture is air and said high pressure is selected within the range of 5.0–8.0 atmospheres.

23. The PSA method as recited in claim 22, wherein said high pressure is selected within the range of 5.0–7.0 atmospheres.

24. The PSA method as recited in claim 14, wherein said mixture is air and said low pressure is selected within the range of 0.3–1.0 atmospheres.

25. The PSA method as recited in claim 24, wherein said low pressure is selected within the range of 0.5–1.0 atmospheres.

26. The PSA method as recited in claim 14, wherein both said venting and purging are accomplished by a gas flow which is counter-current to a flow of said more preferred gas.

* * * * *

UNITED STATES PATENT AND TRADEMARK OFFICE
CERTIFICATE OF CORRECTION

PATENT NO. : 5,735,938
DATED : April 7, 1998
INVENTOR(S) : Baksh et al

It is certified that error appears in the above-indentified patent and that said Letters Patent is hereby corrected as shown below:

Column 1, line 4,
insert --This invention was made with United States Government support under Cooperative Agreement No. 70NANB5H1083 awarded by the Department of Commerce National Institute of Standards and Technology. The United States Government has certain rights in the invention. --

Signed and Sealed this

Thirtieth Day of March, 1999

Attest:

Q. TODD DICKINSON

Attesting Officer

Acting Commissioner of Patents and Trademarks